(12) United States Patent
Kang et al.

(10) Patent No.: US 6,235,860 B1
(45) Date of Patent: May 22, 2001

(54) NATURAL RUBBER PRODUCT FROM FIG TREE AND PRODUCTION METHOD THEREOF

(75) Inventors: Hun-Seung Kang; Kyung-Hwan Han, both of Kwangju (KR)

(73) Assignee: Korea Kuhmo Petrochemical, Co., Seol (KR)

( * ) Notice: Subject to any disclaimer, the term of this patent is extended or adjusted under 35 U.S.C. 154(b) by 0 days.

(21) Appl. No.: 09/322,639

(22) Filed: May 28, 1999

(30) Foreign Application Priority Data

May 10, 1999 (KR) ........................................ 10-1999001640

(51) Int. Cl.[7] .................................................. C08G 83/00
(52) U.S. Cl. .................................................. 528/1; 528/931
(58) Field of Search .......................................... 528/1, 931

(56) References Cited

U.S. PATENT DOCUMENTS 5,717,050 2/1998 Cornish ..................................... 528/1

OTHER PUBLICATIONS

Benedict, C.R. et al., "The Enzymatic Synthesis of Rubber Polymer in Parthenium argentatum Gray" *Plant Physiol*, vol. 92, 1990 pp. 816–821, (No month).

Corinish, K. et al., "Immunoinhibition of Rubber Particle–Bound Cis–Prenyl Transferases in Ficus Elastica and Parthenium Argentatum" *Phytochemistry*, vol. 35, No. 6, pp 1425–1428 1994. (No month).

Light, D. et al., "Purification of a Prenyltransferase That Elongates cis–Polyisoprene Rubber from the Latex of *Heva brasiliensis*" *The Journal of Biological Chemistry*, vol. 264, No. 31 Issue of Nov. 5, pp. 18589–18597, 1969. (No month).

Siler, D. et al., "A Protein From Ficus Elastica Rubber Particles is Related to Proteins from *Hevea Brasiliensis* and Parthenium Argentatum" *Phytochemistry*, vol. 32, No. 5 pp. 1097–1102, 1993. (No month).

Ahmed, W. et al., "Two Triterpenes from the Leaves of *Ficus carica*" *Israel Journal of Botany*, vol. 34, 1985, pp. 283–293 1985. (No month).

Madhavan, S. et al., "Isopentenyl Pyrophosphate cis–1.4–Polyisoprenyl Transferase from Guayule (Parthenium argentatum Gray)" *Plant Physiol*, vol. 75, pp. 908–913 1984. (No month).

Ji, Wan et al., "Seasonal Variations in Rubber Biosynthesis, 3–Hydroxy–3–methylglutaryl–coenzyme A reductase, and Rubber Transferase Activities in Pathenium argentatum in the Chihuahuan Desert" Plant Physiol. 103_535–542 (1993).

Stewart, W.D, et al., "Synthesis of Rubber by Fungi" Science vol. 122:1271–72 (1995).

Stipanovic, Robert D., et al., "Natural Rubber from Sunflower" J. Agric. Food Chem. 28:1322–1323 (1980).

*Primary Examiner*—Nathan M. Nutter
(74) *Attorney, Agent, or Firm*—Mathews, Collins, Shepherd & Gould

(57) ABSTRACT

Natural rubber products are made from fig tree (*Ficus carica*) by homogenizing the plants in an acetone/benzene and separating the rubber-containing phase by centrifugation. *F. carica* contains about 4% (w/v) natural rubber in latex, and 0.3, 0.1 and 0.1 % in bark, leaf and fruit, respectively. Molecular mass of the natural rubber from *F. carica* is about 128 kD. The latex serum of *F. carica* contains only a small numbers of proteins, with a 48 kD and a 25 kD protein as major proteins. Similar to *Hevea brasiliensis* and *Parthenium argentatum* Gray, proteins participating in rubber biosynthesis of *F. carica* are tightly associated with the rubber particles. Natural rubber is made using the latex serum and the proteins in latex, leaf, bark, and fruit of *F. carica*.

4 Claims, 4 Drawing Sheets

NATURAL RUBBER PRODUCT FROM FIG TREE AND PRODUCTION METHOD THEREOF

BACKGROUND OF THE INVENTION

1. Field of the Invention

The present invention relates to a natural rubber product and a production method using whole plant, latex serum, proteins of fig tree(*Ficus carica*).

2. Description of the Prior Art

Natural rubber is a polymer composed of 320 to 35,000 isoprene molecules that are enzymatically linked in a head-to-tail configuration. A large number of plant species contain rubber, including *Hevea brasiliensis, Parthenium argentatum* (guayule) and *Ficus elastica*. Rubber is formed as a branch of the isoprenoid pathway in these plants. Proteins including rubber transferase and rubber elongation factor are required for sequential addition of isopentenyl pyrophosphate units to the growing polyisoprene chain to provide a high molecular weight polymer. In *H. brasiliensis, Parthenium argentatum,* and *Ficus elastica,* rubber transferase and rubber elongation factor are tightly associated with rubber particles where the chain elongation reaction occurs (Madhavan and Benedict, Plant Physiol. 75: 908–913 (1984); Light and Dennis, J. Biol. Chem. 264: 18589–18597 (1989); Siler and Cornish, Phytochem. 32: 1097–1102 (1993)).

Natural rubber (cis-1,4-polyisoprene) is a raw material of choice for heavy-duty tires and other industrial uses requiring elasticity, flexibility and resilience. Among more than 2,000 natural rubber producing plant species (Backhaus, Israel J. Botany 34: 283–293 (1985)), the Brazilian rubber tree (*Hevea brasiliensis*) is the only commercially viable source of natural rubber. However, diminishing acreage of rubber plantation and life-threatening latex allergy to Hevea rubber in hypersensitive individuals, coupled with increasing demand, make development of alternative rubber source imperative. In recent years, guayule (*Parthenium argentatum* Gray) which accumulates rubber in the parenchyma cells and contains high molecular weight rubber comparable to *H. brasiliensis* (Bowers, USDA Report (1990)) has attracted research interest as an additional source for natural rubber. *P. argentatum* Gray has been considered as a commercially viable rubber source for hypoallergenic latex (Cornish, U.S. Pat. Nos. 5,717,050; 5,580,942). However, guayule has limitation as an alternative rubber crop due to slow volume growth and low abundance of rubber particles. Therefore, the search for an effective alternative rubber producing plants has continued. The present invention relates to the synthesis of natural rubber from alternative source of rubber plant.

SUMMARY OF THE INVENTION

The present invention discloses that *Ficus carica* produces natural rubber and the whole latex and/or proteins associated with rubber particles can produce high molecular weight rubber from allylic diphosphate initiator and isopentenyl diphosphate. In accordance with this discovery, it is an object of the present invention to provide a method of making rubber by utilizing latex serum and proteins obtained from such alternative sources. It is another object of the present invention to provide a rubber product made according to the method. Other objects of the present invention will become readily apparent from the following description.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION

Figure 1A:
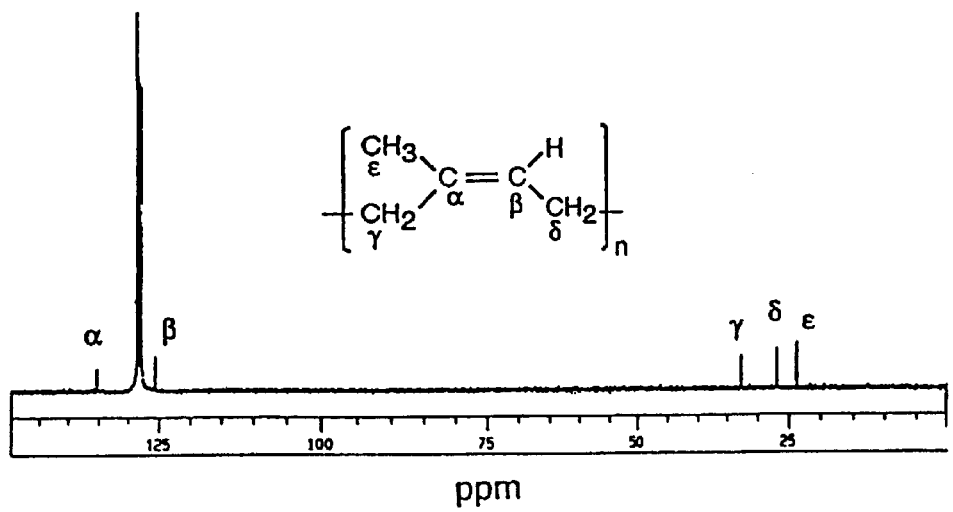
FIG. 1. $^{13}C$ NMR spectra of the natural rubber from (a) *Ficus carica* and (b) *Hevea brasiliensis*. About 5,000 scans were collected at a spectral with of 20,000 Hz. Representative peaks for cis-1,4-polyisoprene are indicated.

Rubbers in *Ficus carica* were prepared by successive extraction with acetone and benzene. FTIR and $^{13}C$ NMR analysis of the samples confirmed that the benzene-soluble residues are natural rubber, cis-1,4-polyisoprene. The rubber content in the latex of *F. carica* is about 4%, where as the rubber content in the bark, leaf and fruit is 0.3, 0.1 and 0.1%, respectively. Gel permeation chromatography revealed that molecular mass of the natural rubber from *F. carica* is about 128 kD. SDS-PAGE analysis showed that the latex serum of *F. carica* contains only a small numbers of proteins, with a 48 kD and a 25 kD protein as major proteins. Similar to *Hevea brasiliensis* and *Parthenium argentatum* Gray, enzymes involved in rubber biosynthesis are tightly associated with the rubber particles in *F. carica*. In vitro rubber biosynthesis assay indicated that whole latex and/or the proteins associated with the rubber particles could produce high molecular weight rubber from allylic diphosphate initiator and isopentenyl diphosphate. Comparison of the effect of EDTA and NaF on in vitro rubber biosynthesis in *F. carica* and *H. Brasiliensis* suggests that divalent metal ions and pyrophosphate present in the latex serum are important factors in determining the different rubber biosynthetic activities in *F. carica* and *H. brasiliensis*.

*Ficus carica* is cultivated for its fruit in southern parts of the temperate zones. When cut, white milky latex drips out copiously from the tissue. It is advantageous to develop *F.*

*carica* as an alternative rubber crop, because of its large latex volume, fast-growth and longlife, and suitability to vegetatively propagate the genetically engineered trees. There has been a number of chemical analyses of the fig tree reporting proteolytic enzymes, amino acids, minerals, sugars, triterpenes, and organic acid (Oner and Akar, Lebensm-Wiss Technol. 26: 318–321 (1993); Kim et al., J. Kor. Agric. Chem. Soc. 35: 51–54 (1992); Ahmed et al., Planta Med. 54: 481 (1988); Shiraishi et al., J. Faculty Agric. Kyushu Univ. 41: 29–33 (1996)). However, there have been no reports on rubber content of this species. Determination of the quantity and quality of the rubber produced in fig tree, and characterization of rubber biosynthetic activity in the latex serum would provide a basis for improvement of the species as an alternative rubber crop.

In the present invention, the content and quality of cis-1,4-polyisoprene in fig tree were determined, and compared them to those in natural rubber producing plants, *Hevea brasiliansis* and *Ficus elastica*. The rubber biosynthetic activity of the latex serum and proteins associated with the rubber particles in fig tree were also investigated. Similar to other rubber producing plants, enzymes involved in rubber biosynthesis in *F. carica* are tightly associated with the rubber particles. The present invention is to use whole plant, latex serum, proteins of *Ficus carica* to make rubber products. The present invention identifies fig tree as an alternative rubber plant, and provides valuable information for developing fig tree as an alternative rubber producing temperate plant.

Figure 1B:
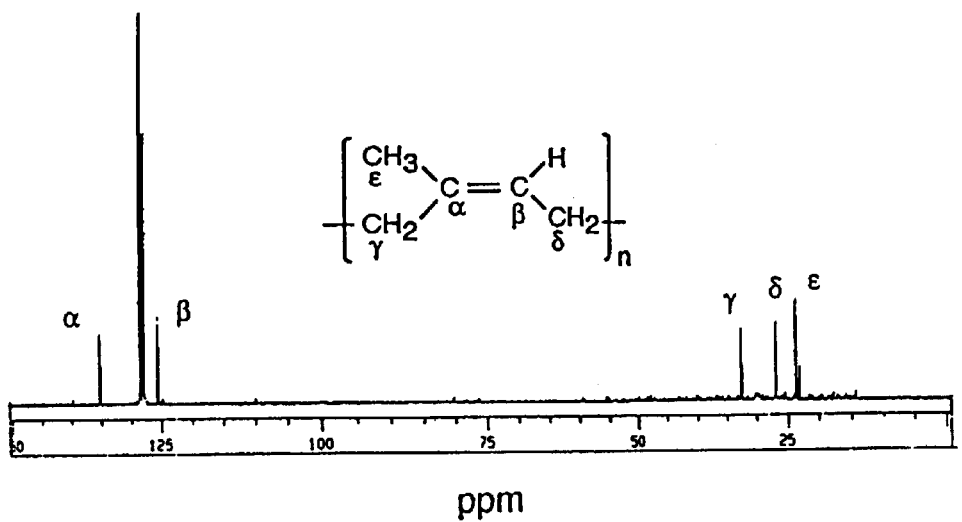

In one approach to produce rubber using Ficus carica, latex was obtained by tapping the fig tree grown either in field or in pot. Natural rubber was obtained by successive extraction with acetone and benzene, and the benzene extracts were identified as natural rubber by using FTIR and $^{13}$C NMR (FIG. 1). Molecular weight of the natural rubber in *F. carica* is 128 kD. The latex of *F. carica* contains about 4% (w/v) of the rubber. However, other parts of *F. carica*, bark, leaf and fruit, contain only 0.1 to 0.3% (w/w) of the rubber. Rubber was synthesized in vitro in the reaction cocktail containing Tris-HCl, pH 7.5, $Mg^{2+}$, DTT, farnesyl pyrophosphate (FPP), isopentenyl pyrophosphate (IPP) and suitable amounts of latex, and the products were analyzed to determine the amount of synthesized rubber (FIG. 2).

Figure 3:
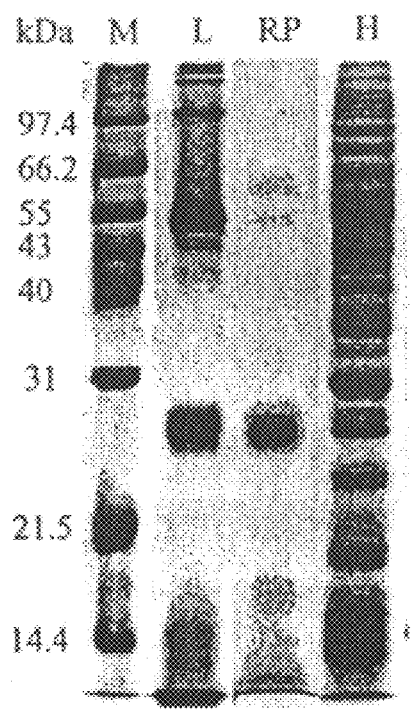
FIG. 3. SDS-12% PAGE analysis of the proteins in latex and rubber particles of *Ficus carica*. Rubber particle proteins were solubilized by incubating the whole latex in a detergent solution containing 0.1% Triton X-100 and 1% SDS. After electrophoresis, proteins were detected by Coomassie Blue staining; L, fig tree latex; RP, washed rubber particle; H, *Hevea brasiliensis* latex; M, marker.

In a second approach, latex was subjected to centrifugation at 40,000 times. g for 1 hour, and the top creamy fraction containing rubber particles was separated from the aqueous phase, called C-serum. The top fraction was further washed with buffer to get washed rubber particles. FIG. 3 shows that the latex of *F. carica* contains several distinct proteins, in which 25 kD and 48 kD proteins are most abundant proteins. These proteins are tightly associated with the enzymatically active rubber particles that catalyze the polymerization of natural rubber. The simple protein profile for the latex of *F. carica* contrasts the *H. brasiliensis* protein profile that contains more than 100 different proteins in size.

Figure 2:
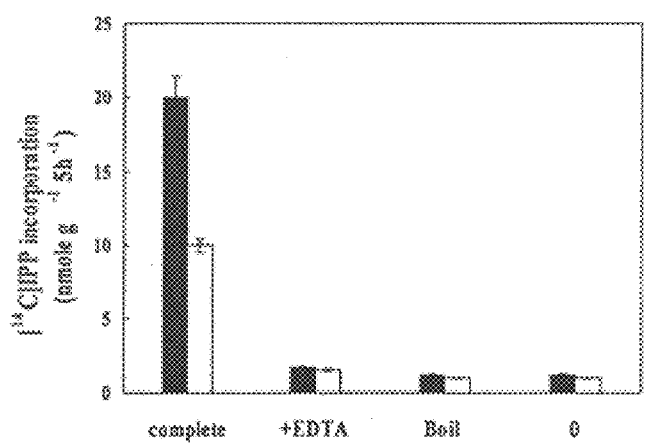
FIG. 2. Rubber biosynthetic activity of latex serum (filled bar) and washed rubber particle (open bar) of *Ficus carica*. Reactions were carried out in reaction mixture containing 100 mM Tris-HCl, pH 7.5, 1 mM $MgSO_4$, 1 mM DTT, 20 $\mu$M FPP, 80 $\mu$M [$^{14}C$]IPP (55 mCi mmol$^{-1}$), and latex serum or washed rubber particle. Reactions were performed at 25° C. for 6 h, the rubbers were extracted with benzene, and the resulting radioactivity of the $^{14}C$-labeled rubber was measured by a liquid scintillation counter; +EDTA, with 25 mM EDTA; Boil, washed rubber particles boiled for 5 min; 0, reaction at 0° C.

In vitro rubber biosynthesis assay described above indicated that rubber was synthesized using either latex serum or washed rubber particle as an enzyme source (FIG. 2).

Figure 4A:
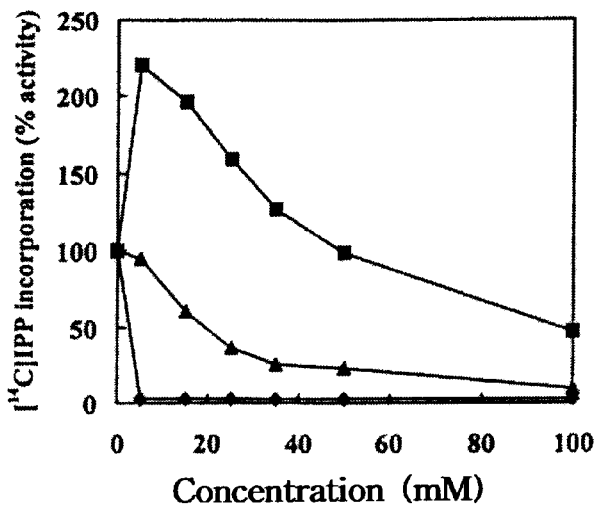
FIG. 4. Effect of (a) EDTA, (b) NaF, and (c) $ZnCl_2$ and iodoacetic acid on the rubber transferase activity in the latex of *F. carica* and *H. brasiliensis*. Reactions were carried out as described in FIG. 2 in the reaction mixture containing latex serum and indicated amounts of chemicals; ■, *F. carica;* ♦, *H. brasiliensis;* ▲, *F. carica* latex filtered to 3 k membrane centricon (Amicon) to remove smaller molecules including $Mg^{2+}$ions; □, iodoacetate; ●, $ZnCl_2$.
Figure 4B:
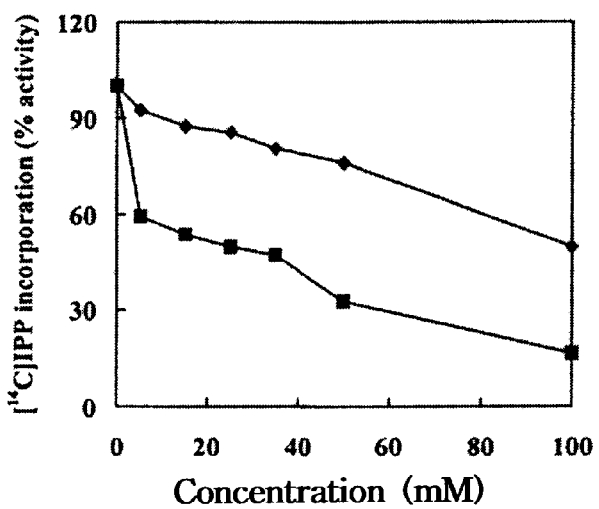
Figure 4C:
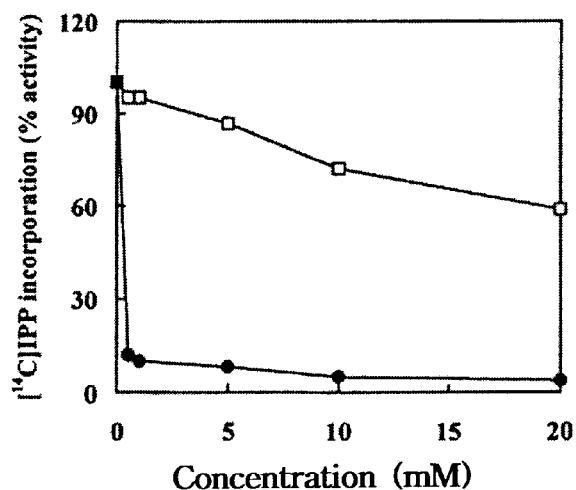

Rubber biosynthetic activities of *H. brasiliensis* and *F. carica* were examined, and it was found that *F. carica* possessed distinct aspect of rubber biosynthetic activity compared to *H. brasilieisis*. During in vitro rubber biosynthesis analysis, an interesting phenomenon was observed that adding EDTA to reaction mixture of *F. carica* did not inhibit, but rather increased the [$^{14}$C]IPP incorporation into rubber. Therefore the effect of EDTA and $Mg^{2+}$ on rubber biosynthesis in the latex of *F. carica* and *H. brasiliensis* was carefully tested. As shown in FIG. 4, for the latex of *F. carica*, addition of EDTA up to 5 mM increased the [$^{14}$C]IPP incorporation into rubber, and a gradual decrease in the [$^{14}$C]IPP incorporation was detected at higher EDTA concentrations. This increasing effect of EDTA on [$^{14}$C]IPP incorporation was not observed in a sample where the latex of *F. carica* was subjected to washing through a membrane (3,000 molecular weight cutoff) to remove smaller molecules including divalent ions necessary for rubber transferase activity. In contrast, a marked reduction in the [$^{14}$C] IPP incorporation was observed for the latex of *H. brasiliensis* by the addition of 5 mM EDTA and higher. These results suggest that unique physiological condition, including the concentration of divalent ions, in the latex of *F. carica* and *H. brasiliensis* exerts differential effects of EDTA on rubber biosynthesis in these two plant species. To further study whether the different physiological environments in the latex of *F. carica* and *H. brasiliensis* affect the rubber biosynthetic activity in vitro, NaF was added to the reaction mixture and its effect on the rubber biosynthetic activity was assessed. As shown in FIG. 4, addition of NaF to the reaction mixture decreased [$^{14}$C]IPP incorporation into rubber in the incubation mixture containing the latex of *F. carica* and *H. brasiliensis*. However, in contrast to EDTA discussed above, NaF inhibited the rubber biosynthesis in *F. carica* more severely than in Hevea latex. The addition of iodoacetate and $ZnCl_2$, well-known inhibitors of prenyltransferase, to the reaction mixture containing the latex of *F. carica* resulted in marked decrease in [$^{14}$C]IPP incorporation (FIG. 4).

The present invention is directed to a natural rubber product comprising the process of, a) homogenizing rubber-containing plants in solvent medium, wherein said solvent medium comprises acetone and benzene;

b) separating the rubber-containing phrase from the solvent phase; and wherein the rubber-containing phant is *Ficus carica*.

The present invention is also directed to a production method of natural rubber by the process of, a) incubating parts of the plant in aqueous medium, wherein said aqueous medium comprises buffers, pH about 7.0 to 8.0, isopentenyl pyrophosphate, and inhibitor molecules;

b) growing the rubber-containing plant; and c) tissue culture of the rubber-containing plant.

In a particular embodiment, the present invention relates to methods of producing rubber wherein said parts are latex, leaf, bark, fruit and whole plant.

In another embodiment, the present invention relates to the methods of producing rubber wherein said parts are the proteins in latex, leaf, bark, fruit and whole plant.

In yet another embodiment, the present invention relates to the methods of producing rubber wherein said plant is a fig tree (*Ficus carica*).

The following example is intended only to further illustrate the invention and is not intended to limit the scope of the invention that is defined by the claims.

EXAMPLES

Example 1

Production of rubber using the latex from *F. carica* (Method 1)

The latex from *F. carica* was collected directly into ice-cold buffer containing 100 mM Tris-HCl, pH 7.5, 5 mM MgSO$_4$, 10 mM DTT, and 0.1 mM PMSF. Rubber biosynthetic activity in vitro was determined in 50 μL of reaction mixture containing 100 mM Tris-HCl, pH 7.5, 80 μM [$^{14}$C]IPP, 20 μM FPP, 1 mM MgSO$_4$, 1 mM DTT and 5 μL latex for 6 h at 25° C. For control experiments, 25 mM of EDTA was added to the reaction mixture to chelate Mg$^{2+}$ necessary for rubber transferase activity. The reaction was stopped by adding 25 mM of EDTA. The resulting [$^{14}$C]IPP-incorporated rubber was quantified by using either a filtration or a benzene extraction method. For filtration method, the reaction mixture was filtered through either 0.02 or 0.1 μm anodisc membrane, the filter was subjected to repeated washing with 1 M HCl and 95% ethanol, and the remaining radioactivity on the washed filters was determined by a liquid scintillation counter. For benzene extraction method, the reaction mixture was extracted three times with two volume of benzene, the benzene extract was mixed with a Ready Solv HP scintillation cocktail, and the radioactivity was determined by a liquid scintillation counter.

Example 2

Production of rubber using washed rubber particles from *F. carica* (Method 2)

Figure 5:
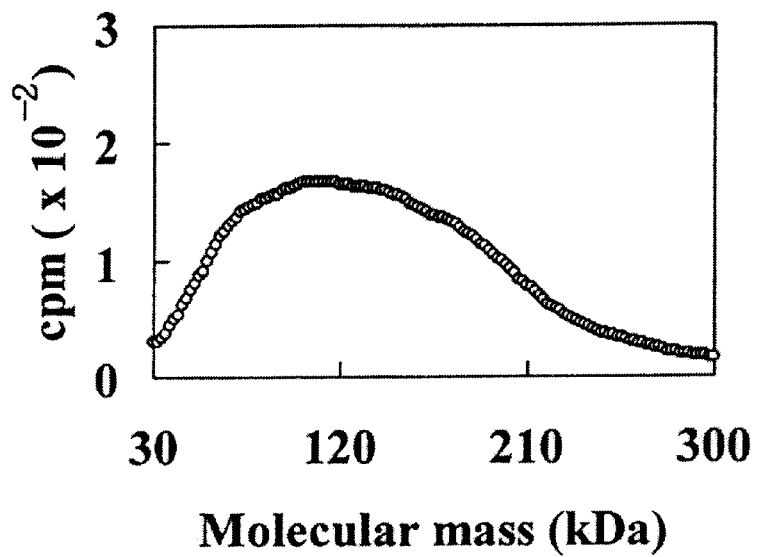
FIG. 5. Molecular weight distribution of $^{14}C$-labeled rubber synthesized in vitro. Reaction was carried out in reaction mixture containing 30 mg WRP as described in FIG. 2. The rubbers synthesized in vitro were extracted with benzene and subjected to a gel permeation chromatography. The eluent monitored by an ELSD was collected at 0.5 minute intervals and assayed for radioactivity.

The latex of *F. carica* was centrifuged at 40,000 time g for 1 hour and the rubber particles at the top layer were collected. The rubber particles were repeatedly washed with the wash buffer containing 100 mM Tris-HCl, pH 7.5, 5 mM MgSO$_4$, and 10 mM DTT by centrifugation. Similar assay described in Method 1 was employed, except using washed rubber particle as an enzyme source, and the resulting [$^{14}$C]IPP-incorporated rubber was quantified by using either a filtration or a benzene extraction method. The molecular weight distribution of rubber synthesized in vitro was estimated by a gel permeation chromatography. The mean molecular weight of in vitro synthesized rubber was similar to that of endogenous rubber present in *Ficus carica* (FIG. 5).

Having described specific preferred embodiment of the invention with reference to the accompanying drawings, it is to be understood that various changes and modifications may be effected therein by one skilled in the art without departing from the scope or spirit of the invention as defined in the appended claims.

What is claimed:

1. A natural rubber product made by the process comprising the steps of:
   a) homogenizing rubber-containing plants in solvent medium, wherein said solvent medium comprises acetone and benzene;
   b) separating the rubber-containing phase from the solvent phase; and wherein the rubber-containing plant is *Ficus carica*.

2. A method for producing natural rubber comprising the step of:
   a) incubating parts of the plant in aqueous medium, wherein said aqueous medium comprises buffers, pH about 7.0 to 8.0, isopentenyl pyrophosphate, and initiator molecules.

3. The production method in accordance with claim 2, wherein said parts are latex, leaf, bark, fruit, and whole plant (*Ficus carica*).

4. The production method in accordance with claim 2, wherein said parts are the proteins in latex, leaf, bark, fruit and whole plant (*Ficus carica*).

* * * * *